Figure 1:
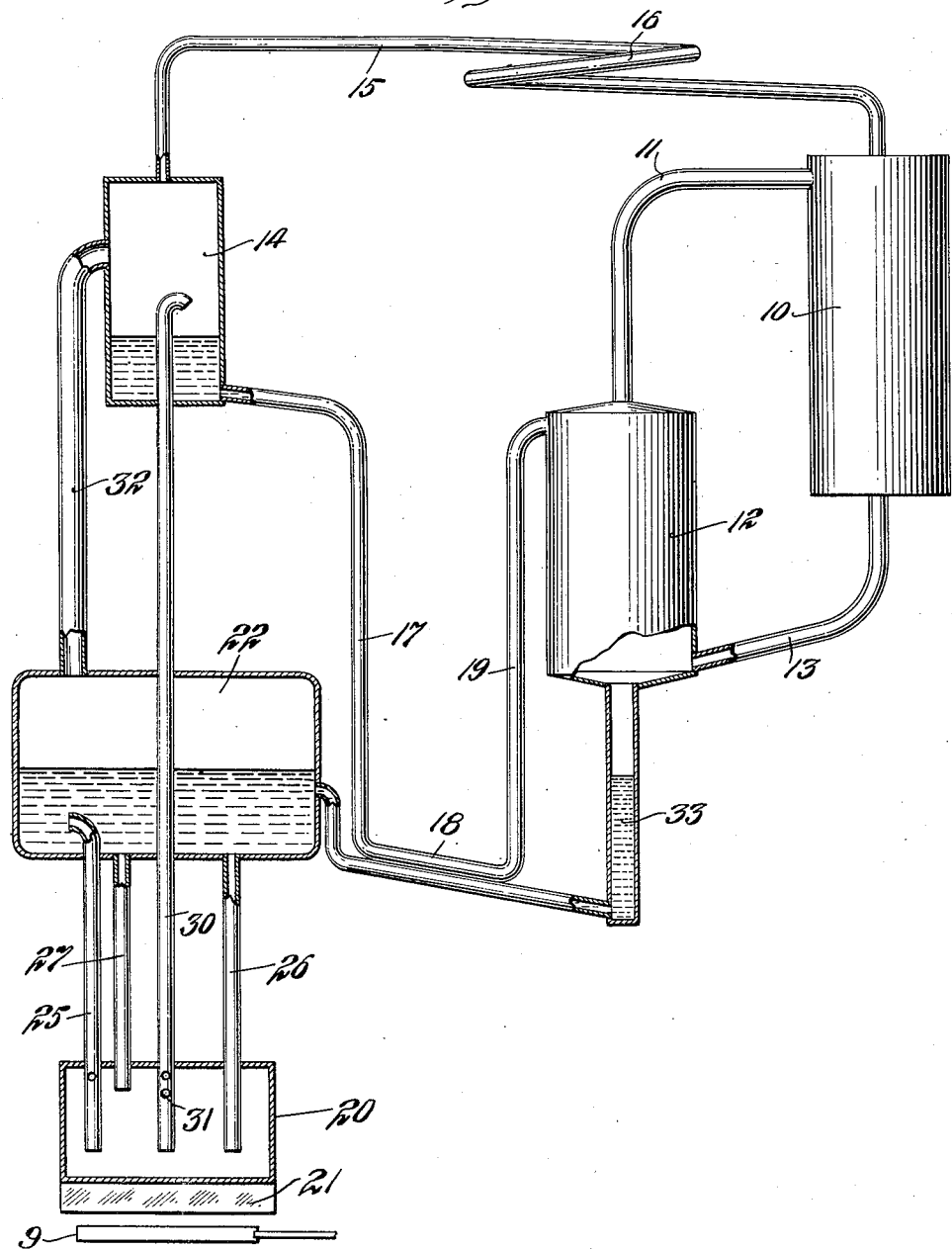

April 17, 1951 B. C. VON PLATEN 2,548,921
ABSORPTION REFRIGERATION
Filed June 26, 1945 2 Sheets-Sheet 1

INVENTOR
Baltzar Carl von Platen
BY
his ATTORNEY

April 17, 1951     B. C. VON PLATEN     2,548,921
ABSORPTION REFRIGERATION
Filed June 26, 1945     2 Sheets-Sheet 2
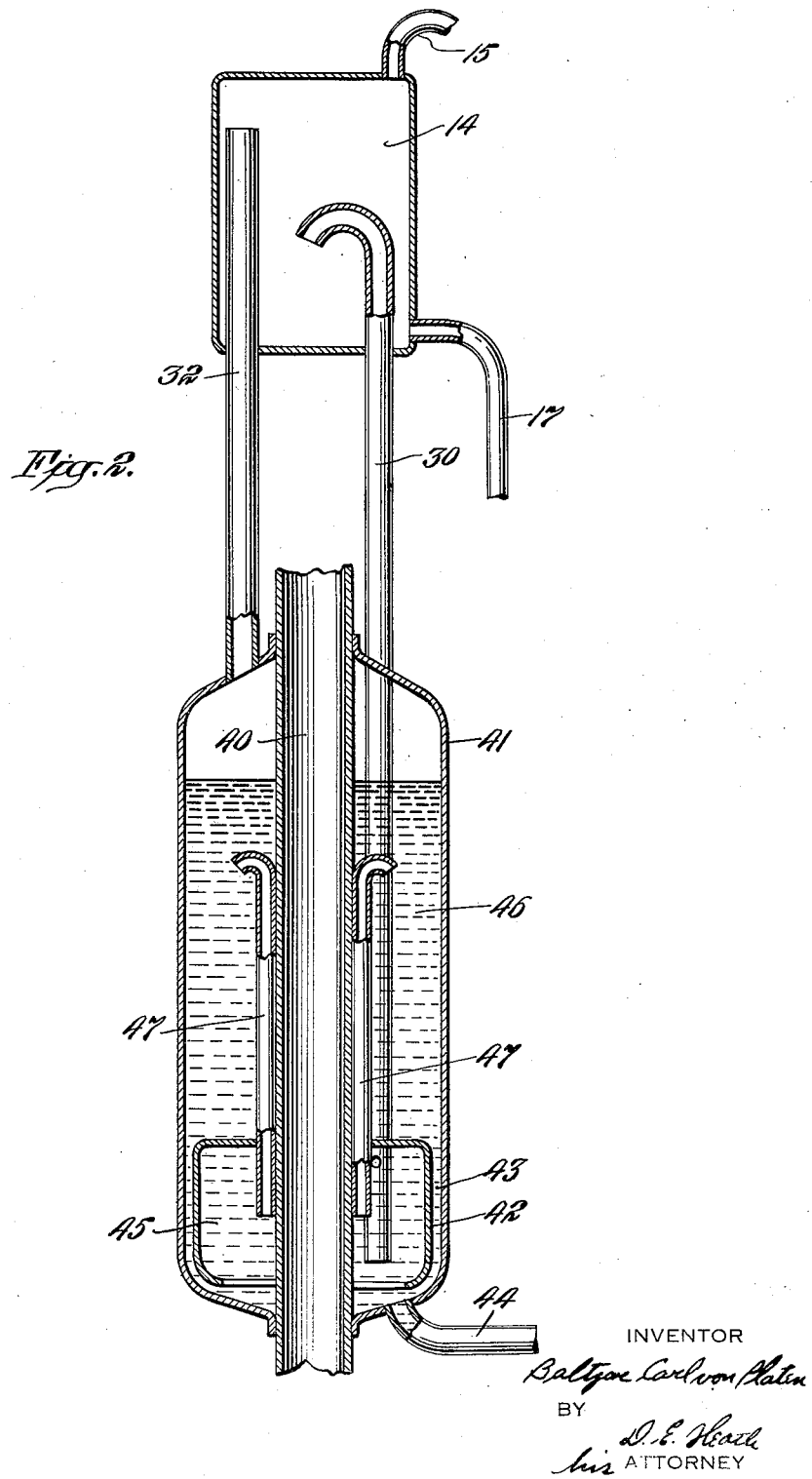
INVENTOR
Baltzar Carl von Platen
BY D. E. Heath
his ATTORNEY

UNITED STATES PATENT OFFICE 2,548,921

ABSORPTION REFRIGERATION

Baltzar Carl von Platen, Stockholm, Sweden, assignor, by mesne assignments, to Aktiebolaget Elektrolux, Stockholm, Sweden, a corporation of Sweden Application June 26, 1945, Serial No. 601,682
In Sweden June 27, 1944

15 Claims. (Cl. 62—119.5)

This invention relates to an arrangement in absorption refrigerating apparatus of the type, in which a solution is utilized as an absorbent and circulated by a liquid pump through the absorber and the boiler of the apparatus. The invention has among other things for its object to prevent stratification or any other separation of components of the absorbent with different density and vapour pressure respectively. The invention is especially intended for use in absorption apparatus in which the absorbent comprises a solution of a salt, for example, a solution of a salt in a liquid refrigerant. In such apparatus there is often a risk of crystallization of the salt and as a consequence a choking of narrow passages in the apparatus, especially in the liquid circulation system.

In earlier known absorption refrigerating apparatus where the liquid circulation is maintained by a thermosiphon pump, which is heat conductively connected to the heat-absorbing element of the apparatus and operated at a relatively high temperature, disturbances of the pumping operation often arise when starting the apparatus, probably due to the fact that the solution located in the pump from the beginning is heated too slowly thus developing small steam bubbles only, which are too small to effect a pumping. If this slow boiling is maintained continuously during a long time, the solution in the pump pipe becomes poor in refrigerant, and therefore a sufficient boiling will not take place, even after the temperature of the pump having arisen to its greatest value. The solution after the first or initial heating period may become so poor or weak in refrigerant that the quantity of heat supplied thereto is not sufficient to effect rapid boiling. It is evident that in apparatus employing solutions of salt, such process may cause a crystallization in the pump of the salt which is not volatile, whereby the apparatus stops operating. Such clogging up in the pump pipe might in apparatus of the type under consideration also take place even by very transient and locally limited superheating of the pump pipe. These inconveniences are eliminated by the invention, which is mainly characterized by one or several members for increasing the liquid circulation within the boiler system in addition to the circulation caused by the supply of liquid from the absorber.

The invention will now be more fully described with reference to embodiments diagrammatically shown in the drawings, and in this connection further characteristic features of the invention will be set forth.

Figs. 1 and 2 show diagrammatically two embodiments of the invention, Fig. 1 illustrating an absorption refrigerating apparatus of the inert gas type employing, for example, lithium-ammonia solution, and Fig. 2 illustrating a modified embodiment of the boiler in the apparatus according to Fig. 1.

In Fig. 1, 10 designates the evaporator and 12 the absorber of the refrigerator, which apparatus parts may be carried out in any well known manner. They communicate through two conduits 11 and 13, through which a continuous circulation of inert gas, for example, hydrogen gas, is effected. While conduits 11 and 13 are shown out of heat exchange relation, these conduits may be arranged to transfer heat therebetween in a manner well known in the art. The numeral 14 designates a vessel for separating vapour, in which the boiler vapours are separated from the absorption solution, whereby the former through a conduit 15 are conducted to the condenser 16 of the apparatus. From the condenser the refrigerant condensate flows into the evaporator 10. With the condenser system and the gas circulating system a pressure vessel (not shown) may be connected in a well known manner. From the gas separating vessel 14 solution poor in refrigerant flows through a conduit 17, a liquid heat exchanger 18 and a conduit 19 to the absorber 12.

The generator unit or boiler proper of the apparatus is designated 20 and may suitably consist of a cylindrical vessel, through the bottom of which heat is supplied to the solution in the boiler from a heat source, for example, a gas burner 9. In order to eliminate the risk of even a transient and locally limited superheating, the bottom of the boiler may be provided with a heat-distributing member, for example, in the form of a solid metal-sheet 21. Above the boiler is provided a storage vessel 22 in which a great part, possibly the greater part of the total quantity of absorption solution is stored. Both vessels 20 and 22 communicate through at least two, and possibly through several conduits which all have the purpose of effecting a continuous circulation of absorption solution through both vessels. The circulation system formed by the conduits 25, 26 and 27 may be so formed and arranged that a pure themical circulation is produced by the differences of density in different parts of the liquid body dependent upon differences in temperature. The circulation system then will operate essentially in the same way as a hot water heating system. In most cases, however, it is suitable to form at least one of the pipes 25, 26, 27 as a vapor-liquid lift pump, such as the pipe 25, for example, thus increasing the local circulation of liquid between the vessels 20 and 22, when the evaporation in the first mentioned vessel grows sufficiently strong. When the pipe 25 is formed to serve as a vapor-liquid lift pump both the conduits 26 and 27 may then serve as return pipes. As a matter of course, these conduits in such case must open into the vessel 20 in such a way that pumping of liquid is not affected therein, the conduits 26 and 27 being so dimensioned that no vapor-liquid lift effect is produced therein.

From the boiler 20 the main pump or riser tube 30 of the apparatus extends upwardly, such tube being formed as a vapor-liquid lift pump having pump vents 31 at the lower end thereof. The pump-pipe at its upper end communicates with the gas separating vessel 14, arranged above the vessel 22, in which vessel 14 a liquid level is maintained, located somewhat higher than the connection of the conduit 19 to the absorber 12. The vapour chambers of the vessels 22 and 14 communicate with each other by a conduit 32, through which vapour flowing into vessel 22 through the pump 25, flows further to vessel 14. The gas separating vessel 14 may be provided with an outflow at the brim, through which an occasional excess of liquid returns to vessel 22.

The solution enriched in the absorber 12 is collected in a vessel or a pipe 33 of relatively small volume and flows through the heat exchanger 18 into the storage-vessel 22. The vessels 20, 22 and 14 and connecting conduits, and also the liquid heat exchanger 18, preferably are enclosed in heat insulation in a well known manner.

When the apparatus, which is cold at the start, is heated by supply of heat to the boiler 20, a circulation of liquid between both vessels 20 and 22 takes place at a low temperature, which circulation becomes even more rapid, the higher the temperature increases and which continues also after beginning of the expulsion of gas. It may now be presumed that the supply of heat to the boiler is so small that the quantity of vapour formed in an interval of time is not sufficient for elevating the solution in the pump or riser tube 30 to vessel 14. On the other hand, vapour flows through the pump pipe 30 as well as through the pump pipe 25 into the gas separating vessel 14 and from there, after condensation in the condenser 16, passes in the form of condensate into the evaporator 10. On account of the absence of liquid pumping effect in the pump 30, no circulation of liquid takes place through the absorber 12 and no evaporization of condensate of refrigerant worth mentioning will take place in the evaporator, but such liquid condensate flows downwardly through the evaporator and conduit 13 down into vessel 33. Such downward flow of the condensate according to the invention causes only a small quantity of condensate of refrigerant to be stored and accumulated in the vessel 33 and does not effect a decrease of the refrigerant concentration in the boiler 20 to such an extent as to cause disturbances in the operation of the apparatus due to crystallization of salt. After the lower part of the vessel 33 is filled with refrigerant condensate further quantities of refrigerant flowing from the evaporator 10 causes refrigerant to flow back to vessel 20, and the concentration of refrigerant in the latter thereafter remains substantially constant. When the supply of heat to the boiler increases sufficiently a pumping effect in the riser tube 30 is produced, and the liquid circulation through the pump 30, gas separating vessel 14, heat exchanger 18 and absorber 12 is started, whereby the changes of concentration, which have appeared during the period of decreased supply of heat, rapidly are equalized.

Because it is desirable to have the generator unit or boiler aggregate thermally insulated it is of great importance to construct it in such a way that an effective heat insulation may be obtained without too much difficulty. Fig. 2 illustrates an embodiment of the invention, where an effective heat insulation is obtained. The reference numerals in Fig. 2 are similar to those for corresponding parts in Fig. 1. Thus 14 indicates the gas separating vessel, with which the main pump 30 of the apparatus communicates, as well as also the vapour pipe 32. The boiler is in the form of a so-called mantle-boiler with a central pipe 40, which when operated by gas and oil serves as a chimney. Around the central pipe the real boiler mantle 41 is fixed by welding, so that an annular space is formed, in which the liquid body of the boiler is held. The vessel 20 in the arrangement according to Fig. 1 corresponds to a bell or dome 42 of such a form that a narrow gap 43 is formed between the bell and the wall of the mantle 41. The rich solution from the absorber flows through a conduit 44, which communicates with the space 45 defined by the dome 42, but may also be arranged to communicate with the liquid body located outside the dome, which liquid body corresponds to the liquid body in vessel 22 in the embodiment of Fig. 1. Conduit 44 is arranged to exchange heat with conduit 17 leading from vessel 14 and containing poor solution. The liquid bodies 45 and 46 are in communication with each other through the gap 43, and also through a number of rising-pipes 47, which correspond to the pump pipe 25 in the arrangement according to Fig. 1, and work as vapor-liquid lift pumps, or only as conduits for the solution heated in the bell 42 and therefore flowing upwardly therethrough. The number of such rising-pipes 47 may be varied from one to six, for example. The colder solution returns through the gap 43 to the space 45 formed within the dome or bell 42. In this way a continuous local circulation of liquid is maintained within the boiler, even at such low temperatures that pumping of liquid through the pump 30 is not effected. Finally it ought to be mentioned that what has been said in connection with Fig. 1 as to the storing of liquid refrigerant outside the boiler also is applicable to the embodiment of Fig. 2.

As already pointed out above, the embodiments of the invention described and shown are especially useful when employing as an absorbent a solution of lithium-ammonia. Of course, this does not mean dissolving metallic lithium in ammonia but dissolving, for example, lithium nitrate, lithium nitrite or lithium chloride in ammonia. Also other salts may be utilized, for example, sodium iodid in an ammoniacal solution. It is generally necessary that such solutions of salts are free from water, because otherwise there will be a risk of corrosion. The arrangement according to the invention may, however, also be utilized for absorption solutions of other kinds, for example, a solution of ammonia in water. The greater the risk for stratification or precipitation of salt, the livelier the transportation of absorbent between the boiler and the storage vessel, communicating with the boiler must be, and generally it is suitable to anticipate so strong a circulation between both vessels that differences of concentration of the solution as a matter of fact will fail to appear.

Modifications of the embodiments of the invention which have been described will occur to those skilled in the art, so that it is desired not to be limited to the particular arrangements set forth, and it is intended in the claims to cover all modifications thereof which do not depart from the spirit and scope of the invention.

I claim:

1. Refrigeration apparatus having a plurality of interconnected parts forming an absorption liquid circuit comprising an absorber and a generator unit including first means defining a space for absorption liquid and a riser tube extending upwardly therefrom through which liquid is adapted to be raised by vapor-lift action to cause circulation of liquid in said circuit, heating means for applying heat to a wall of the space to effect heating of liquid therein and cause raising of liquid in said tube, and structure embodied in said generator unit which provides a path of flow for liquid which, together with said first means, forms a local circuit including the space and through which liquid recirculates, the connection of said path of flow and said space with respect to said wall to which heat is applied being such that intense localized heating by said heating means of liquid returning to said space in the local circuit is substantially avoided whereby superheating of liquid is prevented.

2. Refrigeration apparatus having a plurality of interconnected parts forming an absorption liquid circuit comprising an absorber and a generator unit including a vessel for a body of absorption liquid and a riser tube extending upwardly therefrom through which liquid is adapted to be raised by vapor-lift action to cause circulation of liquid in said circuit, heating means providing a gaseous heating medium which is applied to a wall of said vessel to effect heating of liquid therein and cause raising of liquid in said riser tube, and means embodied in said apparatus which is out of direct physical contact with the gaseous heating medium and provides a path of flow for liquid which, together with said vessel, forms a local circuit in said generator unit for recirculating liquid even when the rate at which heat is applied to said vessel by the gaseous heating medium is ineffective to cause raising of liquid in said riser tube.

3. Refrigeration apparatus having a plurality of interconnected parts forming an absorption liquid circuit comprising an absorber and a generator unit including means defining a space for absorption liquid and a riser tube extending upwardly therefrom through which liquid is adapted to be raised by vapor-lift action to cause circulation of liquid in said circuit, heating means for applying heat to a wall of the space to effect heating of liquid therein and cause raising of liquid in said tube, and means embodied in said generator unit which provides a path of flow for liquid which, together with the space, forms a local circuit extending upwardly above the space for recirculating liquid even when the rate at which heat is applied to said vessel is ineffective to cause raising of liquid in said riser tube.

4. Refrigeration apparatus having a plurality of interconnected parts forming an absorption liquid circuit comprising an absorber and a generator unit including means defining a space for absorption liquid and a riser tube extending upwardly therefrom through which liquid is adapted to be raised by vapor-lift action to cause circulation of liquid in said circuit, heating means for applying heat to a wall of the space to effect heating of liquid therein and cause raising of liquid in said tube, and structure embodied in said generator unit which provides a path of flow for liquid which, together with the space, forms a local circuit having a portion disposed above the space and through which liquid recirculates, such portion being adapted to hold a body of absorption liquid with which said riser tube is in intimate contact.

5. Absorption refrigeration apparatus including an absorber, a generator unit including means defining a space and a riser tube extending upwardly therefrom through which liquid is adapted to be raised by vapor-lift action, means for conducting raised liquid to said absorber, means for conducting liquid from said absorber to the space, and means for diverting liquid from the space to said means through which liquid is conducted from said absorber to the space to cause liquid to flow a second time to the space.

6. Refrigeration apparatus having a plurality of interconnected parts forming an absorption liquid circuit comprising an absorber and a generator unit including means defining a space adapted to hold absorption liquid and a riser tube extending upwardly therefrom through which liquid is adapted to be raised by vapor-lift action to cause circulation of liquid in said circuit through and between said absorber and said generator unit, and means for conducting liquid from the space and again introducing such liquid into the space with liquid flowing from said absorber to said generator unit.

7. Refrigeration apparatus having a plurality of interconnected parts forming an absorption liquid circuit comprising an absorber and a generator unit including a vessel for absorption liquid and a riser tube extending upwardly therefrom through which liquid is adapted to be raised by vapor-lift action to cause circulation of liquid in said circuit, an upright heating flue associated with said vessel and arranged to effect heating of liquid therein and cause raising of liquid in said tube, and means embodied in said generator unit which provides a path of flow for liquid which, together with said vessel, forms a local circuit for recirculating liquid through said vessel even when the rate at which heat is supplied to said vessel from said heating flue is ineffective to cause raising of liquid in said riser tube by vapor-lift action.

8. In a method of refrigeration which includes flowing absorption liquid from a place of absorption to a place which is externally heated, and raising the liquid by vapor-lift action from said place of heating and flowing such raised liquid back to the place of absorption, the improvement which comprises circulating liquid in a path of flow leading upwardly from and back to the place of heating to cause absorption liquid to circulate faster through the place of heating than the rate at which it flows from the place of absorption.

9. In a method of refrigeration with the aid of an absorption solution having a salt dissolved therein which has a tendency to precipitate and effect clogging under certain operating conditions and which includes flowing such solution from a place of absorption to a place which is externally heated, and raising the solution by vapor-lift action from said place of heating and flowing such raised solution back to the place of absorption, the improvement which comprises maintaining a body of the solution above the place of heating, and circulating solution in a path of flow leading upwardly from the place of heating to said body of solution and from the latter back to the place of heating to cause solution to circulate faster through the place of heating than the rate at which it flows from the place of absorption, whereby the tendency for the salt to precipitate is substantially minimized.

10. The improvement set forth in claim 9 in which circulation of said solution in said path of flow is effected thermally due to differences in density of the solution.

11. The improvement set forth in claim 9 in which circulation of said solution in said path of flow is induced by vapor-lift action.

12. The improvement set forth in claim 9 in which said solution raised by vapor-lift action from said place of heating and flowing to the place of absorption passes in thermal exchange relation with said body of solution while being raised from said place of heating.

13. The improvement set forth in claim 9 in which said body of solution is externally heated.

14. The improvement set forth in claim 9 in which a salt selected from the class consisting of lithium nitrate, lithium nitrite, lithium chloride and sodium iodide is dissolved in the absorption solution.

15. The improvement set forth in claim 9 in which the absorption solution comprises ammonia in which is dissolved a salt selected from the class consisting of lithium nitrate, lithium nitrite, lithium chloride and sodium iodide.

BALTZAR CARL von PLATEN.

REFERENCES CITED

The following references are of record in the file of this patent:

UNITED STATES PATENTS

| Number | Name | Date |
|---|---|---|
| 612,804 | Howell | Oct. 18, 1898 |
| 1,693,553 | Munters | Nov. 27, 1928 |
| 2,170,656 | Grubb | Aug. 22, 1939 |
| 2,287,441 | McGinnis | June 23, 1942 |
| 2,321,060 | Ashby | June 8, 1943 |
| 2,352,472 | Coons | June 27, 1944 |